US010001290B2

(12) United States Patent
Toriyama et al.

(10) Patent No.: US 10,001,290 B2
(45) Date of Patent: Jun. 19, 2018

(54) AIR-CONDITIONING APPARATUS CONTROL SYSTEM

(75) Inventors: Kuniaki Toriyama, Tokyo (JP); Mitsuru Kitazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 330 days.

(21) Appl. No.: 14/395,531

(22) PCT Filed: Jun. 26, 2012

(86) PCT No.: PCT/JP2012/004108
§ 371 (c)(1),
(2), (4) Date: Oct. 20, 2014

(87) PCT Pub. No.: WO2014/002132
PCT Pub. Date: Jan. 3, 2014

(65) Prior Publication Data
US 2015/0081108 A1    Mar. 19, 2015

(51) Int. Cl.
*F24F 11/30*    (2018.01)
*F24F 11/00*    (2018.01)
(Continued)

(52) U.S. Cl.
CPC .......... *F24F 11/0009* (2013.01); *F24F 11/30* (2018.01); *F24F 11/62* (2018.01);
(Continued)

(58) Field of Classification Search
CPC ..... F24F 11/0009; F24F 11/006; G05B 15/02; G05B 19/05; G05B 2219/15052;
(Continued)

(56) References Cited

U.S. PATENT DOCUMENTS 8,140,791 B1 * 3/2012 Greene ............... G06F 11/1464
711/162
8,245,006 B2 * 8/2012 Yasaki ................. G06F 3/0623
711/166
(Continued)

FOREIGN PATENT DOCUMENTS

EP    1936294 A1    6/2008
EP    2322864 A1    5/2011
(Continued)

OTHER PUBLICATIONS

Meghan B. Coulehan, Guidelines for responsible data management in scientific research, Clinical Tool, Inc., Jan. 2006, 38 pages.*
(Continued)

*Primary Examiner* — Thomas C Lee
*Assistant Examiner* — Tri T Nguyen
(74) *Attorney, Agent, or Firm* — Posz Law Group, PLC (57) ABSTRACT

An air-conditioning apparatus control system includes connected devices each including a memory to sequentially store control data which is acquired during operation and is associated with control of the connected device. To back up the control data in the memory of the connected device, a backup destination is selected from the other connected devices included in a plurality of air-conditioning apparatuses constituting the air-conditioning apparatus control system on the basis of an available memory space in each of the other connected devices. The control data is backed up to the selected backup destination at time when it is determined that backup has no interference with communication for a normal operation in the air-conditioning apparatus control system.

13 Claims, 8 Drawing Sheets

(51) Int. Cl.
  *G05B 19/05* (2006.01)
  *G06F 11/14* (2006.01)
  *G05B 15/02* (2006.01)
(52) U.S. Cl.
  CPC ............ *G05B 15/02* (2013.01); *G05B 19/05* (2013.01); *G06F 11/1448* (2013.01); *G06F 11/1461* (2013.01); *F24F 11/52* (2018.01); *G05B 2219/15052* (2013.01); *G05B 2219/2642* (2013.01); *G06F 11/1464* (2013.01)
(58) Field of Classification Search
  CPC ......... G05B 2219/2642; G06F 11/1448; G06F 11/1461; G06F 2011/0091; G06F 11/1464
  See application file for complete search history.

(56) References Cited

U.S. PATENT DOCUMENTS

| | | | | |
|---|---|---|---|---|
| 2002/0143999 | A1* | 10/2002 | Yamagami | G06F 3/0605 709/249 |
| 2003/0140637 | A1* | 7/2003 | Masui | F24F 11/006 62/127 |
| 2005/0055521 | A1* | 3/2005 | Saika | G06F 11/1032 711/162 |
| 2006/0090050 | A1* | 4/2006 | Zohar | G06F 11/2076 711/162 |
| 2007/0174675 | A1* | 7/2007 | Lee | G11B 27/034 714/6.11 |
| 2009/0139251 | A1* | 6/2009 | Masui | F24F 11/0009 62/129 |
| 2009/0183519 | A1* | 7/2009 | Nishikawa | F25B 49/005 62/132 |
| 2013/0060719 | A1* | 3/2013 | Burke | G06Q 10/063 705/412 |
| 2015/0078391 | A1* | 3/2015 | Kubo | F24F 11/006 370/400 |

FOREIGN PATENT DOCUMENTS

| | | | |
|---|---|---|---|
| JP | 62-182547 | A | 8/1987 |
| JP | 05-120110 | A | 5/1993 |
| JP | 07-262067 | A | 10/1995 |
| JP | 2000-234792 | A | 8/2000 |
| JP | 2003-308238 | A | 10/2003 |
| JP | 2005-308254 | A | 11/2005 |
| JP | 2006-039876 | A | 2/2006 |
| JP | 2010-225021 | A | 10/2010 |
| JP | 2010-258874 | A | 11/2010 |
| JP | 2011-153793 | A | 8/2011 |

OTHER PUBLICATIONS

Machine translation of JPH0942737, Matsui Keizo, Air conditioning controller, Feb. 14, 1997, 23 pages.*
Aiming Zhou, Comparative Analysis and Policy Study on Residential Electricity Bills in Selected ADB Member Countries, May 2012, 23 pages.*
Coulehan, MB et al., Clinical tools, Inc., Guidelines for Responsible Data Management in Scientific Research, 2006, United States, Department of Health and Human service, Office of Research Integrity, 46 pages.*
Chinese Office Action for the corresponding CN application No. 201280073545.4 was dated May 31, 2016.(English ranslation attached).
International Search Report of the International Searching Authority dated Sep. 25, 2012 for the corresponding international application No. PCT/JP2012/004108 (and English translation).
Extended European Search Report dated Feb. 10, 2016 in the corresponding EP application No. 12880202.2.
Office Action dated Jul. 21, 2015 in the corresponding Japanese patent application No. 2014-522223 (English translation attached).
Office Action dated Nov. 23, 2016 issued in corresponding CN patent application No. 201280073545.4 (and English translation).

* cited by examiner

| CONNECTED DEVICE | CONTROL DATA | RAW DATA/CALCULATED DATA | IMPORTANT/ UNIMPORTANT |
|---|---|---|---|
| CONTROLLER | BILLING DATA | RAW DATA | IMPORTANT DATA |
| | OPERATING TIME DATA | RAW DATA | IMPORTANT DATA |
| | ELECTRICITY RATE DATA | CALCULATED DATA | IMPORTANT DATA |
| | REFRIGERANT EFFICIENCY | CALCULATED DATA | UNIMPORTANT DATA |
| OUTDOOR UNIT | OPERATING FREQUENCY | RAW DATA | UNIMPORTANT DATA |
| INDOOR UNIT | SUCTION TEMPERATURE | RAW DATA | UNIMPORTANT DATA |
| | SUCTION HUMIDITY | RAW DATA | UNIMPORTANT DATA |
| GENERAL PURPOSE DEVICE | DEVICE TREND DATA | RAW DATA | UNIMPORTANT DATA |
| REMOTE CONTROL | OPERATION DESCRIPTIONS | RAW DATA | UNIMPORTANT DATA |

AIR-CONDITIONING APPARATUS CONTROL SYSTEM

CROSS REFERENCE TO RELATED APPLICATION

This application is a U.S. national stage application of PCT/JP2012/004108 filed on Jun. 26, 2012, the contents of which are incorporated herein by reference.

TECHNICAL FIELD

The present invention relates to an air-conditioning apparatus control system.

BACKGROUND ART

A technique has recently been developed which backs up setting data associated with a plurality of air-conditioning apparatuses controlled in a centralized manner by a controller in a system so that the setting data can be reconstructed in case of loss of the setting data stored in the controller. Specifically, various setting data items used for control of the air-conditioning apparatuses stored in the controller are backed up not to a recording medium (e.g., a hard disk, a floppy disk, a CD-ROM, or a CD-RAM) but to the air-conditioning apparatuses which are controlled by the controller, such that the setting data associated with each air-conditioning apparatus is backed up to the air-conditioning apparatus or the setting data associated with all of the air-conditioning apparatuses is backed up to each of the air-conditioning apparatuses (see, for example Patent Literature 1.)

According to this technique, if the setting data, stored in the controller, associated with the air-conditioning apparatuses is lost, a memory of the controller can be reconstructed on the basis of the setting data backed up to the air-conditioning apparatuses.

CITATION LIST

Patent Literature

Patent Literature 1: Japanese Unexamined Patent Application Publication No. 2005-308254 (abstract)

SUMMARY OF INVENTION

Technical Problem

According to the technique disclosed in Patent Literature 1, only the setting data is a backup target. Backing up of control data, such as an operation history, a suction humidity history, a suction temperature history, and operating time, has not been mentioned. It is, however, preferred to back up control data, which is required to determine an operating situation of an air-conditioning apparatus before maintenance or calculate the rate of electricity used in the air-conditioning apparatus. According to the technique disclosed in Patent Literature 1, setting data, which is to be backed up, is overwritten in a backup destination to back up the latest setting data. Control data, however, should be accumulated and stored without being overwritten because it is preferred to grasp a history of the control data. Accordingly, the control data has to be backed up in consideration of the capacity of a memory. Such a point has not also been mentioned in Patent Literature 1.

Furthermore, according to the technique disclosed in Patent Literature 1, the setting data stored in the controller is backed up to the air-conditioning apparatuses at appropriate time intervals. For example, if a plurality of controllers and a plurality of air-conditioning apparatuses are connected in the same network, the traffic of backup data will be added to the traffic of signals communicated in a normal operation state during, for example, a time period during which the communication traffic is heavy. Unfortunately, backup may interfere with transmission and reception of data necessary for a normal operation. This leads to reduced reliability of such an air-conditioning apparatus control system.

The present invention has been made in consideration of the above-described disadvantages. It is an object of the present invention to provide an air-conditioning apparatus control system capable of backing up control data effectively using a memory of a connected device included in the system without interfering with communication for a normal operation.

Solution to Problem

The present invention provides an air-conditioning apparatus control system that includes a plurality of air-conditioning apparatuses each including an outdoor unit, an indoor unit, and a controller managing and controlling the outdoor unit and the indoor unit in a centralized manner, the outdoor unit, the indoor unit, and the controller being connected so as to communicate with each other, the air-conditioning apparatuses being connected so as to communicate with each other, the outdoor unit, the indoor unit, and the controller each serving as a connected device included in the air-conditioning apparatus control system. Each connected device includes a memory configured to sequentially store control data which is acquired during operation and is associated with control of the connected device, and an arithmetic unit configured to start a backup process at backup start time. The backup process executed by the arithmetic unit includes a backup destination selection subprocess of selecting a backup destination from the other connected devices included in the air-conditioning apparatuses based on an available memory space of each of the other connected devices, an execution timing determination subprocess of determining backup execution timing so that backup has no interference with communication for a normal operation in the air-conditioning apparatus control system, and a backup execution subprocess of transmitting the control data stored in the memory to the backup destination selected in the backup destination selection subprocess at the execution timing determined in the execution timing determination subprocess to back up the control data to the backup destination.

Advantageous Effects of Invention

The air-conditioning apparatus control system according to the present invention can back up control data effectively using the memory of each of the connected devices included in the air-conditioning apparatus control system without interfering with communication for a normal operation.

DESCRIPTION OF EMBODIMENTS

Embodiment 1

Figure 1:
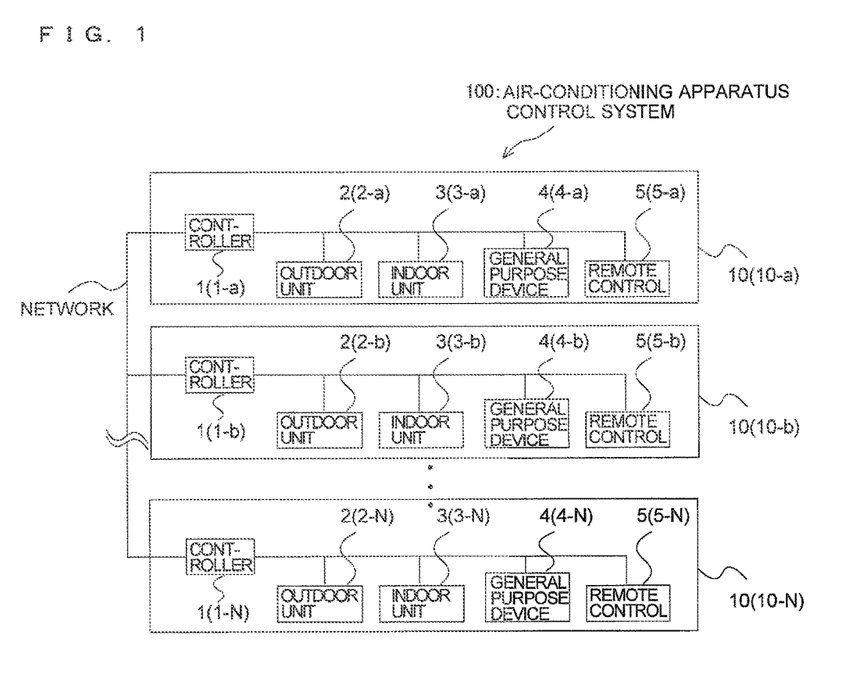
FIG. 1 is a system diagram of an air-conditioning apparatus control system according to Embodiment 1 of the present invention.

FIG. 1 is a system diagram of an air-conditioning apparatus control system according to Embodiment 1 of the present invention.

An air-conditioning apparatus control system 100 includes a plurality of air-conditioning apparatuses (hereinafter, abbreviated to "apparatuses") 10. Each apparatus 10 includes a controller 1, an outdoor unit 2, an indoor unit 3, a general purpose device 4, and a remote control 5 to control the indoor unit 3 remotely. Such devices are connected so as to communicate data with each other. FIG. 1 illustrates an exemplary configuration of the system in which each apparatus includes different kinds of connected device (i.e., the controller 1, the outdoor unit 2, the indoor unit 3, the general purpose device 4, and the remote control 5) and a single device is connected for each kind. However, any number of connected devices of each kind may be arranged. A plurality of devices of each kind may be connected.

The controllers 1 in the respective apparatuses 10 are connected via a network so as to communicate data with each other. In the following description, if the individual apparatuses 10 have to be distinguished from one another, the apparatuses 10 will be designated by reference characters, for example, 10-a, 10-b, . . . , 10-n. The other devices will be similarly designated by reference characters. Each connected device is assigned an address so that the connected devices can be distinguished from one another. In communication, each connected device transmits a signal including a source address and a destination address in communication.

Figure 2:
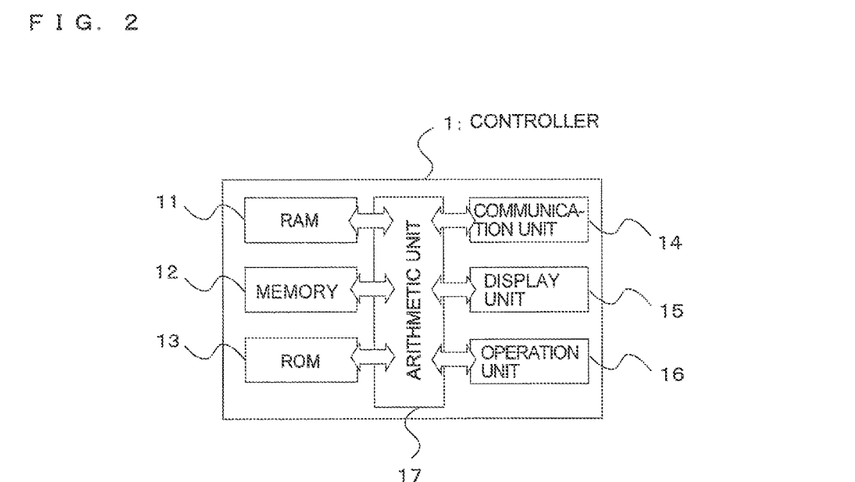
FIG. 2 is a block diagram illustrating the configuration of each controller in FIG. 1.

FIG. 2 is a block diagram illustrating the configuration of each controller 1 in FIG. 1.

The controller 1 is a device to manage and control the outdoor unit 2 and the indoor unit 3 in a centralized manner. The controller 1 includes a RAM 11, a memory 12, and a ROM 13. The RAM 11 temporarily stores data associated with control by an arithmetic unit (e.g., a CPU) 17. The memory 12 stores control data associated with control of the controller 1, various control data items received through a communication unit 14, and setting data (including schedule setting information) set through an operation unit 16. The ROM 13 stores a control program. The controller 1 further includes the communication unit 14 for communication with the other connected devices, a display unit 15 to display and provide various information items to a user, an operation unit 16 through which the user operates and sets the air-conditioning apparatus control system 100, and the arithmetic unit 17 to control the components 11 to 16 in the controller 1.

The schedule setting information is information on which communication traffic throughout the day in the air-conditioning apparatus control system 100 can be determined based. For example, information about an operating state of the indoor unit 3 depending on time is stored as schedule setting information. For example, the information indicates that the indoor unit 3 operates at 25 degrees C. from eight to twelve. The schedule setting information may include date and day setting.

Figure 3:
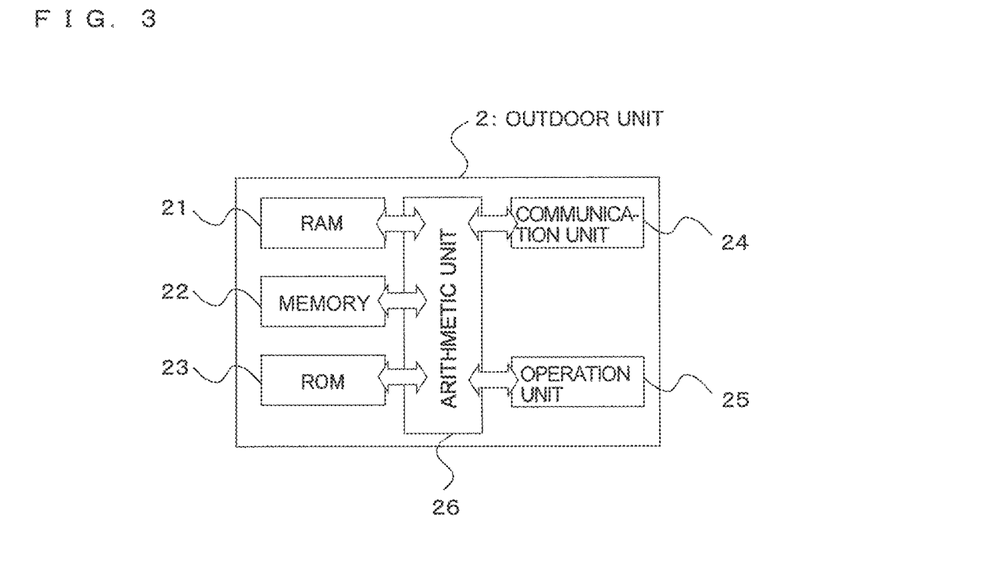
FIG. 3 is a block diagram illustrating the configuration of each outdoor unit in FIG. 1.

FIG. 3 is a block diagram illustrating the configuration of each outdoor unit in FIG. 1.

The outdoor unit 2 includes a RAM 21, a memory 22, and a ROM 23. The RAM 21 temporarily stores data associated with control by an arithmetic unit (e.g., a CPU) 26. The memory 22 stores control data associated with control of the outdoor unit 2, various control data items received through a communication unit 24, and setting data set through an operation unit 25. The ROM 23 stores a control program. The outdoor unit 2 further includes the communication unit 24 for communication with the other connected devices, the operation unit 25 to perform setting, and the arithmetic unit 26 to control the components 21 to 25 in the indoor unit 3.

Figure 4:
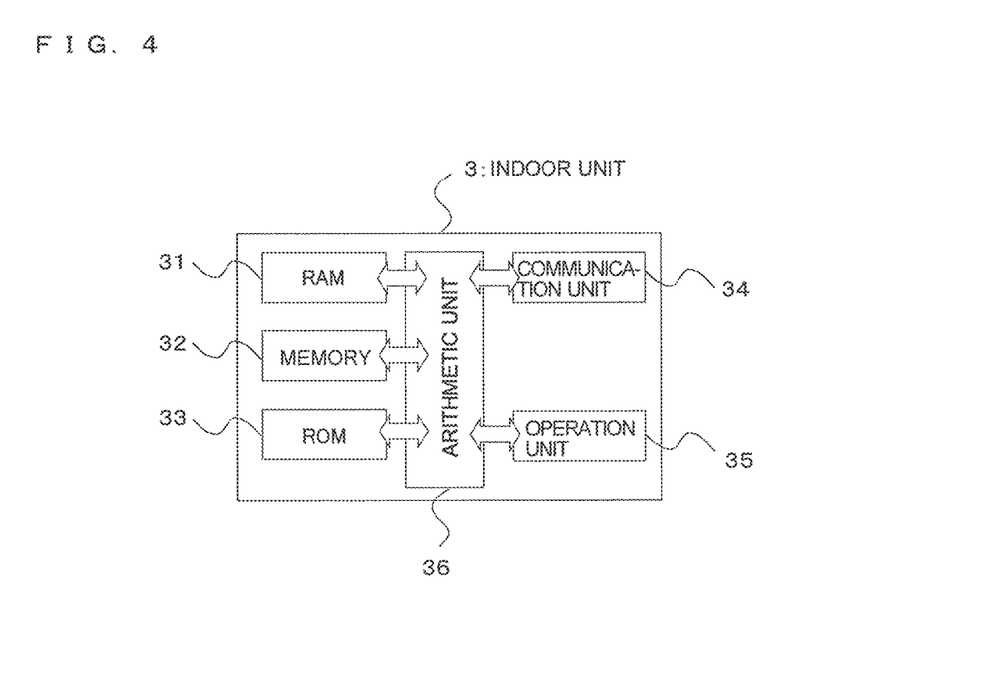
FIG. 4 is a block diagram illustrating the configuration of each indoor unit in FIG. 1.

FIG. 4 is a block diagram illustrating the configuration of each indoor unit in FIG. 1.

The indoor unit 3 includes a RAM 31, a memory 32, and a ROM 33. The RAM 31 temporarily stores data associated with control by an arithmetic unit (e.g., a CPU) 36. The memory 32 stores control data associated with control of the indoor unit 3, various control data items received through a communication unit 34, and setting data set through the operation unit 35. The ROM 33 stores a control program. The indoor unit 3 further includes the communication unit 34 for communication with the other connected devices, the operation unit 35 to perform setting, and the arithmetic unit 36 to control the components 31 to 35 in the indoor unit 3. The indoor unit 3 further includes a detection sensor (not illustrated) to detect a suction temperature or a suction humidity.

Figure 5:
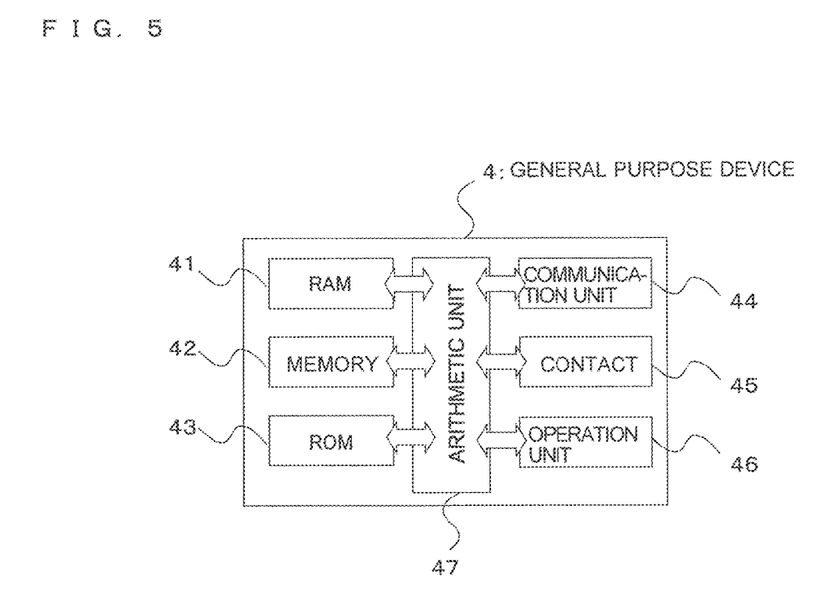
FIG. 5 is a block diagram illustrating the configuration of each general purpose device in FIG. 1.

FIG. 5 is a block diagram illustrating the configuration of each general purpose device in FIG. 1.

The general purpose device 4 is, for example, a device called a programmable logic controller (PLC) whose contact is connected to, for example, a light and a thermometer. This device allows control such that, for example, the indoor unit 3 is activated when the light is turned on, and a cooling operation is started when the temperature reaches, for example, 30 degrees C. or higher.

The general purpose device 4 includes a RAM 41, a memory 42, and a ROM 43. The RAM 41 temporarily stores data associated with control by an arithmetic unit (e.g., a CPU) 47. The memory 42 stores control data associated with control of the general purpose device 4, various control data items received through a communication unit 44, and setting data set through an operation unit. The ROM 43 stores a control program. The general purpose device 4 further includes the communication unit 44 for communication with the other connected devices, a contact 45 having analog input and output terminals and digital input and output terminals, an operation unit 46 to perform setting of the contact 45, and the arithmetic unit 47 to control the components 41 to 46 in the general purpose device 4.

Figure 6:
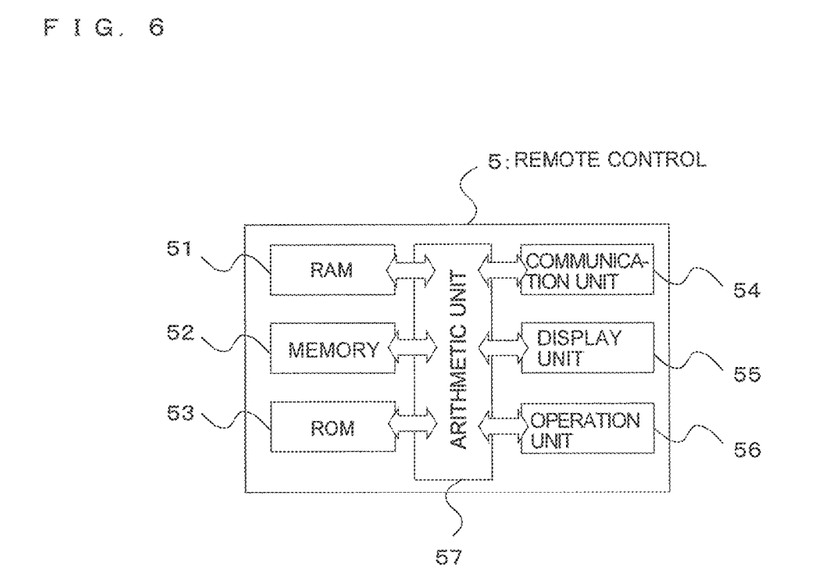
FIG. 6 is a block diagram illustrating the configuration of each remote control in FIG. 1.

FIG. 6 is a block diagram illustrating the configuration of each remote control in FIG. 1.

The remote control 5 includes a RAM 51, a memory 52, and a ROM 53. The RAM 51 temporarily stores data associated with control by an arithmetic unit (e.g., a CPU) 57. The memory 52 stores control data associated with control of the remote control 5, various control data items received through a communication unit, and setting data set through an operation unit. The ROM 53 stores a control program. The remote control 5 further includes a communication unit 54 for communication with the other connected devices, a display unit 55 to display and provide various information items to the user, an operation unit 56 through which the user operates and sets the air-conditioning apparatus control system, and the arithmetic unit 57 to control the components 51 to 56 in the remote control 5.

The above-described connected devices (the controller 1, the outdoor unit 2, the indoor unit 3, the general purpose device 4, and the remote control 5) sequentially store control data acquired over time into the memories 12, 22, 32, 42, and 52, respectively.

Figure 7:
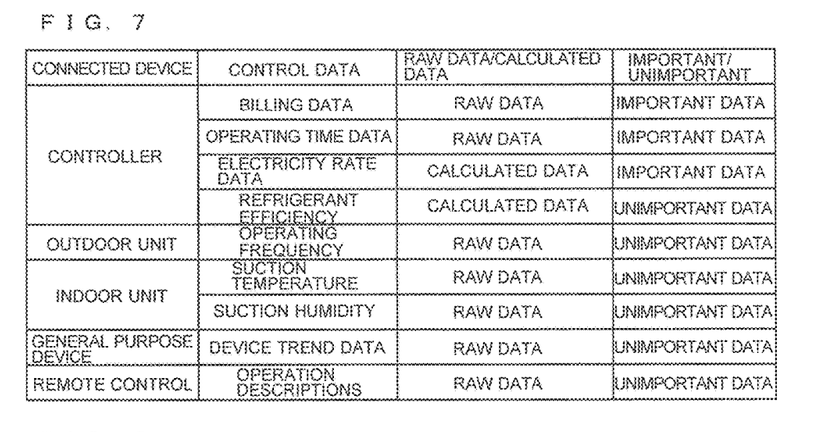
FIG. 7 is a diagram illustrating a table describing control data concerning such connected devices in FIG. 1.

FIG. 7 is a diagram illustrating a table describing control data concerning the connected devices. Each control data item is control data associated with the corresponding connected device acquired during operation. The user may set control data for each connected device as appropriate. The control data in FIG. 7 is given for illustration and any other control data may be used in the invention.

Data (e.g., billing data and data about operating time) related to energy consumption of the entire air-conditioning apparatus control system 100 is set as control data for the controller 1. An operating frequency is set as control data for the outdoor unit 2. Operation data (e.g., a suction humidity and a suction temperature) is set as control data for the indoor unit 3.

For the general purpose device 4, trend data about devices connected to the contact is set as control data. For the remote control 5, for example, operation descriptions are set as control data. Each control data item is designated as important data or unimportant data. The important data is intended to be protected from loss. In this case, billing data, operating time data, and electricity rate data are designated as important data. The user can optionally set which of the control data items is important data at the time of initial setting or the like. Raw data and calculated data in FIG. 7 will be described in Embodiment 3, which will be described later.

Control data items stored in the memories 12, 22, 32, 42, and 52 in the connected devices are targets to be backed up. A functional configuration of a backup process executed in each of the arithmetic units 17, 26, 36, 47, and 57 of the respective connected devices will now be described.

The backup process executed in each of the arithmetic units 17, 26, 36, 47, and 57 is divided into three main subprocesses, a backup destination selection subprocess, an execution timing determination subprocess, and a backup execution subprocess.

In the backup destination selection subprocess, a connected device to be a backup destination is selected from the connected devices included in the air-conditioning apparatus control system 100 and is determined as the backup destination. Backup destinations include not only the connected devices in the apparatus 10 which a backup source connected device belongs but also all of the connected devices in the other apparatuses 10. As regards a way of selection, for example, an available memory space of each of the connected devices other than the backup source connected device is checked and an optimum backup destination is selected. The optimum backup destination may be selected in consideration of a control load state in addition to the available memory space. Selection of the optimum backup destination will be described later.

Each controller 1 periodically communicates with the connected devices in the same apparatus 10 to check an available memory space and a control load state (load state of the arithmetic unit) in each connected device. Furthermore, the controller 1 communicates with the other controllers 1 in the other apparatuses 10, so that the controller 1 can check an available memory space and a control load state (load state of the arithmetic unit) in each of the connected devices in the other apparatuses 10.

If the backup source connected device is the outdoor unit 2, the indoor unit 3, the general purpose device 4, or the remote control 5, the backup source connected device sends a query about an available memory space in each of the connected devices in the same apparatus 10 and the connected devices in the other apparatuses 10 to the controller 1 in the same apparatus 10, which the backup source connected device belongs. The backup source connected device then selects an optimum backup destination in accordance with a response to the query. If the backup source connected device is the controller 1, the controller 1 sends a query about an available memory space in each of the connected devices to each of the other controllers 10 in the other apparatuses 10 and then selects an optimum backup destination on the basis of a response to the query from each of the other controllers 1 and an available memory space, which is stored as data in the controller 1, in each of the connected devices in the same apparatus 10.

In the execution timing determination subprocess, backup execution timing is determined based on communication traffic in the network of the air-conditioning apparatus control system 100. Specifically, when the current communication traffic is less than a predetermined amount, execution timing is determined so that backup is immediately executed. When the current communication traffic is greater than or equal to the predetermined amount, execution timing is determined so that backup is executed in a time period during which the communication traffic is less than the predetermined amount.

In the backup execution subprocess, control data stored in the memory is transmitted to a backup destination selected in the backup destination selection subprocess at execution timing determined in the execution timing determination subprocess to back up the control data to the backup destination.

When control data is stored into each memory, the corresponding arithmetic unit changes time to start the backup process in accordance with whether the control data is important data or unimportant data. If the control data is unimportant data, the backup process is not executed at this time. When the amount of data stored in the memory exceeds a threshold value previously set, the backup process is started. On the other hand, if the control data is important data, the backup destination selection subprocess is executed to select a backup destination and the control data is immediately backed up to the backup destination.

The threshold value may be determined as follows. Which data should be acquired (stored into the memory) is set at the time of initial setting. The rate per time of storing of data set to be stored can be estimated to some extent based on the kind of data and the system configuration at the initial setting time. Accordingly, the threshold value may be determined in consideration of a memory capacity and a storing rate per time. Although the threshold value of the amount of data stored is used as in this case, a period may be used as an alternative to the amount of data stored. Specifically, as described above, since the rate of storing of data in the memory can be estimated to some extent at the initial setting time, a period during which data can be stored in the memory can be calculated in consideration of the memory capacity and the storing rate per time. For example, a day after three months may be determined as a threshold value (to start backup after three months). Alternatively, the threshold value may be determined based on the proportion of data stored in the memory or remaining days or time during which control data can be stored. The threshold value is set for each connected device.

A backup operation in the air-conditioning apparatus control system 100 will now be described.

Figure 8:
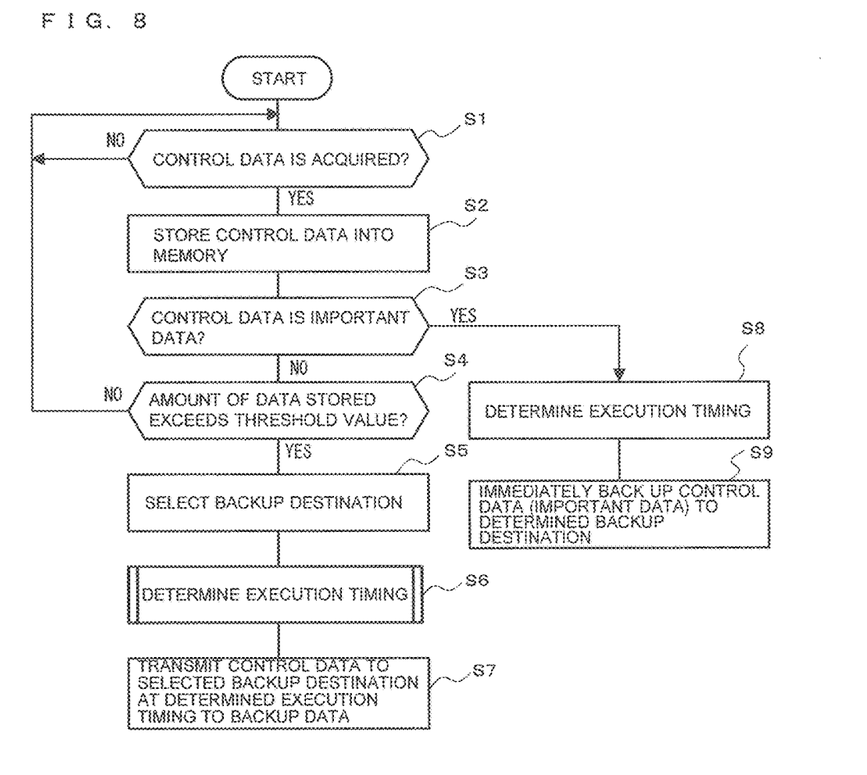
FIG. 8 is a flowchart illustrating backup of control data in any connected device in the air-conditioning apparatus control system according to Embodiment 1 of the present invention.

FIG. 8 is a flowchart illustrating control data backup in any connected device in the air-conditioning apparatus control system according to Embodiment 1 of the present invention. Steps of the operation will now be described. Since the process performed in each connected device is the same, it is assumed in the following description that the indoor unit 3-*a* in the apparatus 10-*a* is a backup source.

When control data is acquired in the indoor unit 3-*a* (S1), the arithmetic unit 36 of the indoor unit 3-*a* stores the control data into the memory 32 of the indoor unit 3-*a* (S2) and determines whether the control data is important data (S3).

When it is determined that the acquired control data is not important data, the indoor unit 3-*a* executes processing in steps S4 to S7. When it is determined that the control data is important data, the indoor unit 3-*a* executes processing in steps S8 and S9. The processing in steps S4 to S7 executed when it is determined that the acquired control data is unimportant data will now be described. The processing in steps S8 and S9 executed when it is determined that the acquired control data is important data will be described later.

In step S4, whether the amount of data stored in the memory 12 exceeds the previously set threshold value is determined as described above (S4). When the amount of data stored in the memory 12 is less than or equal to the previously set threshold value, the backup process is not performed and the operation returns to step S1. On the other hand, when the amount of data stored in the memory 12 exceeds the threshold value, the backup process is performed (S5 to S8). Specifically, the indoor unit 3-*a* selects a backup destination from the connected devices included in the air-conditioning apparatus control system 100 and determines the selected device as a backup destination (S5). More specifically, the arithmetic unit 36 of the indoor unit 3-*a* checks an available memory space in each of the connected devices in the same apparatus 10 and the connected devices in the other apparatuses 10 by sending a query about the available memory space in each of the connected devices to the controller 1-*a* in the same apparatus 10, and then selects an optimum backup destination based on the result of check.

A way of selecting an optimum backup destination can be appropriately set depending on a utility form or the like of the air-conditioning apparatus control system 100. For example, the connected device having the largest available memory space may be selected as an optimum destination. Alternatively, the connected device including the memory whose available memory space is greater than a predetermined capacity and whose storage amount or number of storage times is small and whose storage rate is low may be selected as an optimum destination. Alternatively, the connected device in which a load on the arithmetic unit is small because the number of connected devices to be controlled is small may be selected as an optimum destination.

After the backup destination is determined in the above-described manner, the indoor unit 3-*a* then performs the execution timing determination subprocess of determining backup execution timing (S6). The execution timing determination subprocess will now be described with reference to FIG. 9.

Figure 9:
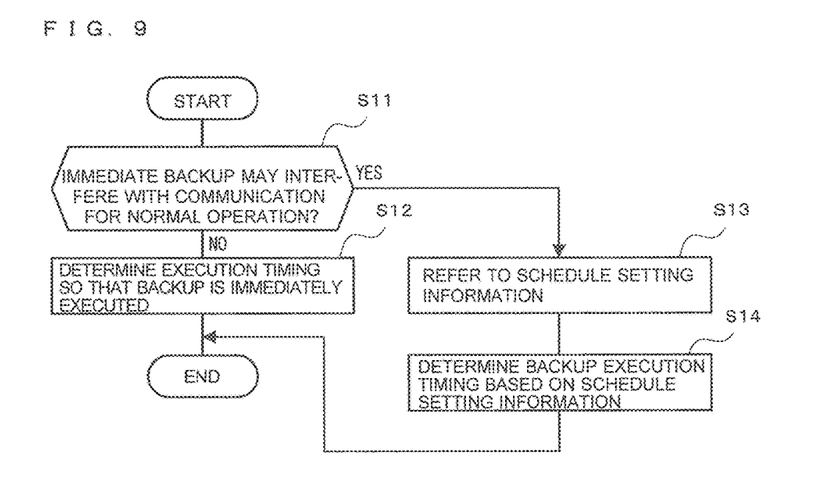
FIG. 9 is a flowchart illustrating an execution timing determination subprocess in FIG. 8.

FIG. 9 is a flowchart illustrating the execution timing determination subprocess in FIG. 8.

The indoor unit 3-*a* determines, in consideration of the current communication traffic in the network, whether performing immediate backup may interfere with communication for a normal operation (S11). When determining that executing immediate backup will have no interference with communication for the normal operation, the indoor unit 3-*a* determines execution timing (backup data transmission time) so that backup is immediately executed (S12). Execution time can be determined in consideration of a load status of the indoor unit 3-*a* and a load status of the backup destination in addition to the communication traffic.

On the other hand, when determining in step S11 that executing immediate backup may interfere with communication for the normal operation, the indoor unit 3-*a* refers to schedule setting information stored in the controller 1-*a* (S13) and determines execution timing (backup data transmission time) so that backup is executed in a time period during which communication traffic in the entire air-conditioning apparatus control system 100 is less than the predetermined amount (S14).

Figure 10:
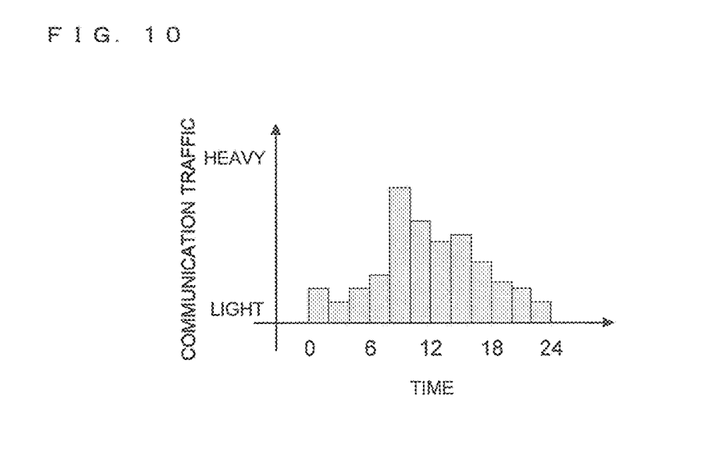
FIG. 10 is a diagram illustrating the amounts of communication traffic of one day in a network.

FIG. 10 is a diagram illustrating the amounts of communication traffic of one day in the network. In FIG. 10, the axis of abscissas denotes the time and the axis of ordinates denotes the communication traffic.

Each connected device obtains data about rough amounts of communication traffic from the schedule setting information stored in the corresponding controller 1 and determines execution timing based on this data.

The flowchart of FIG. 8 will now be again described.

After the above-described execution timing determination subprocess, the indoor unit 3-*a* transmits and backs up control data in the memory 12 to the backup destination selected in step S5 at the execution timing determined in step S6 (S7).

Figure 11:
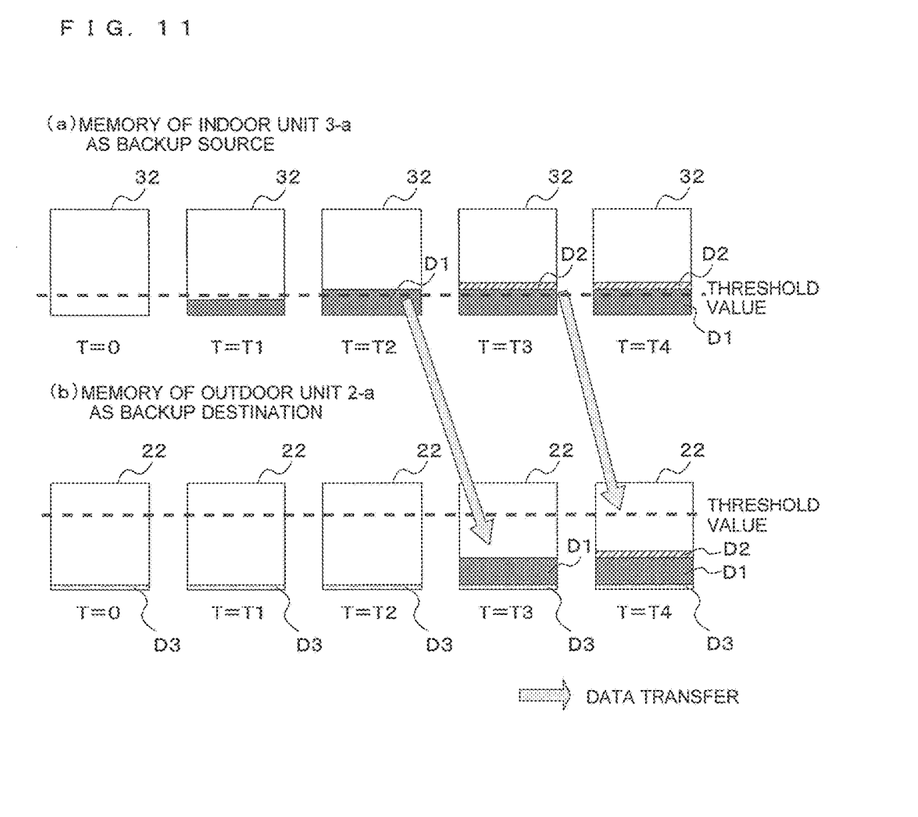
FIG. 11 includes diagrams illustrating a change in data stored in a memory of a backup source connected device and a change in data stored in a memory of a backup destination connected device before and during backup.

FIG. 11 includes diagrams illustrating a change in data stored in the memory of a backup source connected device and a change in data stored in the memory of a backup destination connected device before and during backup. In FIG. 11, each colored portion denotes data stored in the memory. In the following description, it is assumed that the backup source connected device is the indoor unit 3-*a* and the backup destination connected device is the outdoor unit 2-*a*. In FIG. 11, each arrow denotes data transfer. In the following description, it is assumed that communication traffic is less than or equal to the predetermined amount and backup is immediately executed.

At time T=0, the memory 32 of the backup source indoor unit 3-*a* is empty. At time T1, control data is stored by an amount less than or equal to the threshold value indicated by a dotted line in FIG. 11. At time T2, the amount of data stored in the memory 32 is a data amount D1 exceeding the threshold value. At time T3, data of a data amount D2 is further stored into the memory 32. At time T4, data is not further stored and the data amount of D1+D2 is kept.

In this change of the amount of data stored in the indoor unit 3-*a*, the data amount D2 of the memory 32 exceeds the threshold value at time T2. Accordingly, the indoor unit 3-*a* transmits the whole of data corresponding to the data amount D1 in the memory 32 to the selected backup destination outdoor unit 2-*a*. The outdoor unit 2-*a* stores data of a data amount D3 at each of times T0 to T2. At time T3, the outdoor unit 2-*a* further stores the data corresponding to the data amount D1 transmitted from the indoor unit 3-*a* into the memory 22.

At time T3, control data corresponding to the data amount D2 is stored in the memory 32 of the indoor unit 3-*a*. At this time, the amount of data stored in the memory 32 of the indoor unit 3-*a* has exceeded the threshold value. The indoor unit 3-*a* accordingly starts the backup process and initially selects a backup destination. In this case, the indoor unit 3-*a* again selects the outdoor unit 2-*a* as a backup destination in consideration of traffic and then transmits the control data corresponding to the data amount D2 to the backup destination outdoor unit 2-*a*. Specifically, the whole of the data in the memory 32 is backed up at first backup time following the exceeding of the threshold value by the stored data amount. At the subsequent backup time, the control data newly stored in the memory 32 is backed up.

The outdoor unit 2-*a*, which has received the control data of the data amount D2, further stores the received control data of the data amount D2 into the memory 22 at T4.

The flowchart of FIG. 8 will now be again described.

The above-described processing is executed when it is determined in step S3 that the control data is unimportant data. On the other hand, when it is determined in step S3 that the control data is important data, backup is immediately executed (S8, S9). Specifically, a backup destination is selected (S8) in a manner similar to step S5. The control data (important data) is immediately transmitted to the backup destination determined in step S8 to back up the control data to the backup destination (S9).

As described above, according to Embodiment 1, control data in the memory is backed up at the time when it is determined that executing backup has no interference with communication for a normal operation in the air-conditioning apparatus control system 100. Consequently, the risk of control data loss due to a sudden failure of a connected device can be reduced. Additionally, executing backup of the control data can be achieved without interference with communication for a normal operation of the air-conditioning apparatus control system 100.

According to Embodiment 1, a backup destination is dynamically selected based on an available memory space of each of the connected devices other than the backup source connected device. Consequently, the memories of all of the connected devices can be more effectively used than a case where a predetermined backup destination is used. In other words, the memories of all of the connected devices included in the air-conditioning apparatus control system 100 can be evenly used without wasting any storage space. This prevents backup concentrated execution of any particular connected device, thus leading to a longer life of each memory and contributing to an increase in life of each product.

Since important data of control data is immediately backed up, there is no blank period during which important data is not backed up. In case of important data loss, the data can be reliably reconstructed. At first backup time following the exceeding of the threshold value by the amount of data stored in the memory, control data of an amount exceeding the threshold value is backed up at once. Accordingly, traffic has to be taken into consideration as described above. However, if only important data to be immediately backed up is transmitted together with data of communication traffic at that time, the total traffic would not exceed available communication traffic. Accordingly, immediate backup would not interfere with communication for a normal operation.

According to the backup method in Embodiment 1, control data in a backup source connected device may be distributed to free memories of all of the connected devices other than the backup source connected device and be backed up to the free memories. Accordingly, the backup source connected device may store the addresses of backup destinations so as to specify a backup destination when reconstructing data.

Embodiment 2

Embodiment 2 relates to a backup method suitably used when communication traffic in the network of the air-conditioning apparatus control system 100 is greater than or equal to a specific amount throughout the day. The difference between Embodiment 2 and Embodiment 1 will now be described mainly. Modifications applied to the components in Embodiment 1 may be applied to similar components in Embodiment 2. The same applies to Embodiments 3 and 4, which will be described later.

The configuration of an air-conditioning apparatus control system 100 in Embodiment 2 is the same as that in Embodiment 1 illustrated in FIG. 1. A flowchart in Embodiment 2 is similar to that in Embodiment 1 illustrated in FIG. 8, except for the execution timing determination subprocess to be performed when the amount of data stored in the memory exceeds the threshold value.

Figure 12:
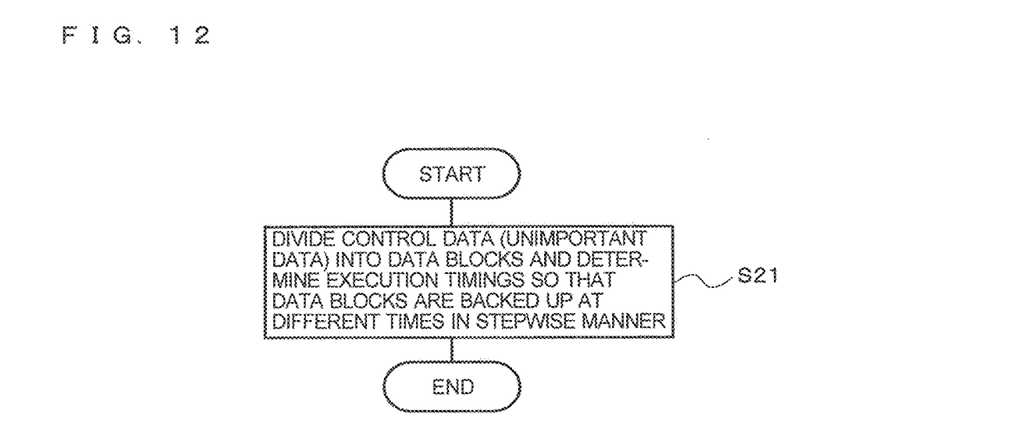
FIG. 12 is a flowchart illustrating a backup execution timing determination subprocess in an air-conditioning apparatus control system according to Embodiment 2 of the present invention.

FIG. 12 is a flowchart of a backup execution timing determination subprocess in the air-conditioning apparatus control system according to Embodiment 2 of the present invention. The flowchart of FIG. 12 relates to processing to be executed when traffic in a network of the air-conditioning apparatus control system 100 is greater than or equal to a specific amount throughout the day.

In the system in such a traffic status, if control data in a memory is backed up at once at first backup time following exceeding of a threshold value by the amount of data stored in the memory, the backup would interfere with communication for a normal operation. At the first backup time following the exceeding of the threshold value by the amount of data stored in the memory of a backup source connected device, the backup source connected device accordingly divides the control data in the memory into a plurality of data blocks and determines execution timings so that the data blocks are backed up at different times in a stepwise manner (S21).

As described above, Embodiment 2 offers the same advantages as those of Embodiment 1 and further achieves backup without interference with communication for a normal operation if traffic in the network of the air-conditioning apparatus control system 100 is greater than or equal to the specific amount throughout the day.

Embodiment 3

Embodiment 3 relates to effective backup based on a determination as to whether control data is raw data acquired by a detector, such as a suction temperature sensor, during operation or calculated data obtained based on raw data.

The configuration of an air-conditioning apparatus control system 100 according to Embodiment 3 is the same as that in Embodiment 1 illustrated in FIG. 1.

Figure 13:
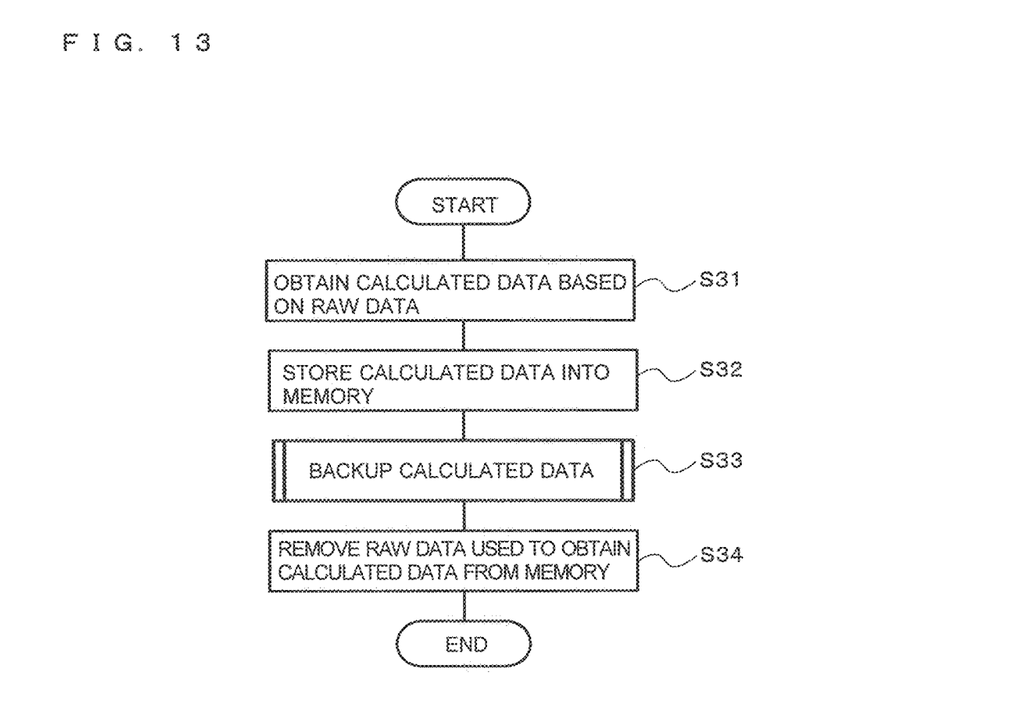
FIG. 13 is a flowchart illustrating backup of control data in any connected device in an air-conditioning apparatus control system according to Embodiment 3 of the present invention.

FIG. 13 is a flowchart illustrating backup of control data in any connected device in the air-conditioning apparatus control system according to Embodiment 3 of the present invention. The distinction between "raw data" and "calculated data" of control data is as illustrated in FIG. 7.

The air-conditioning apparatus control system 100 executes processing of obtaining predetermined data based on "raw data" (S31). For example, processing of calculating an electricity rate per hour in a certain area on the basis of billing data and operating time data is executed. This electricity rate data corresponds to "calculated data".

When acquiring "raw data" during operation, a backup source connected device stores the "raw data" into the memory of the device (such processing is not illustrated in the flowchart of FIG. 13) and also stores the electricity rate data, serving as "calculated data", into the memory (S32) because the electricity rate data is also control data. Then, the backup source connected device backs up the "calculated data" to a backup destination (S33). Backup processing in step S33 is the same as that in Embodiments 1 and 2. The backup processing is executed in the above-described manner.

In this case, the size of "raw data" is greater than that of "calculated data". Accordingly, the backup source connected device removes the "raw data" used to obtain the "calculated data" from the memory of the device (S34) after storing the "calculated data" into the memory in step S32.

As described above, Embodiment 3 offers the same advantages as those of Embodiments 1 and 2. Additionally, according to Embodiment 3, a backup source connected device stores "calculated data" into the memory of the device, backs up the "calculated data", and after that, removes "raw data" used to obtain the "calculated data" from the memory of the device. Consequently, the following advantage is achieved: removal of "raw data" prevents a waste of memory space of a backup source connected device because the size of "raw data" is greater than that of "calculated data".

Furthermore, for example, if an electricity rate is intended to be displayed on the remote control 5-a, such a connected device which needs "calculated data" may acquire the "calculated data" through the network from a calculation source connected device in which the "calculated data" has been obtained, and accordingly does not have to allow the arithmetic unit of the device to calculate based on "raw data" acquired from the calculation source connected device. Advantageously, a traffic load can be reduced and a load on the CPU of the connected device which needs "calculated data" can also be reduced.

Although the "calculated data" obtained based on the plurality of "raw data" items has been described as an example, calculated data may be obtained based on a single raw data item by predetermined calculation.

Embodiment 4

According to Embodiment 4, a backup source connected device changes the amount of data to be transmitted of control data stored in the memory of the device depending on a control load state (load state of the arithmetic unit) of a backup destination connected device, and transmits the data to the backup destination connected device.

The configuration of an air-conditioning apparatus control system 100 according to Embodiment 4 is the same as that in Embodiment 1 illustrated in FIG. 1.

Figure 14:
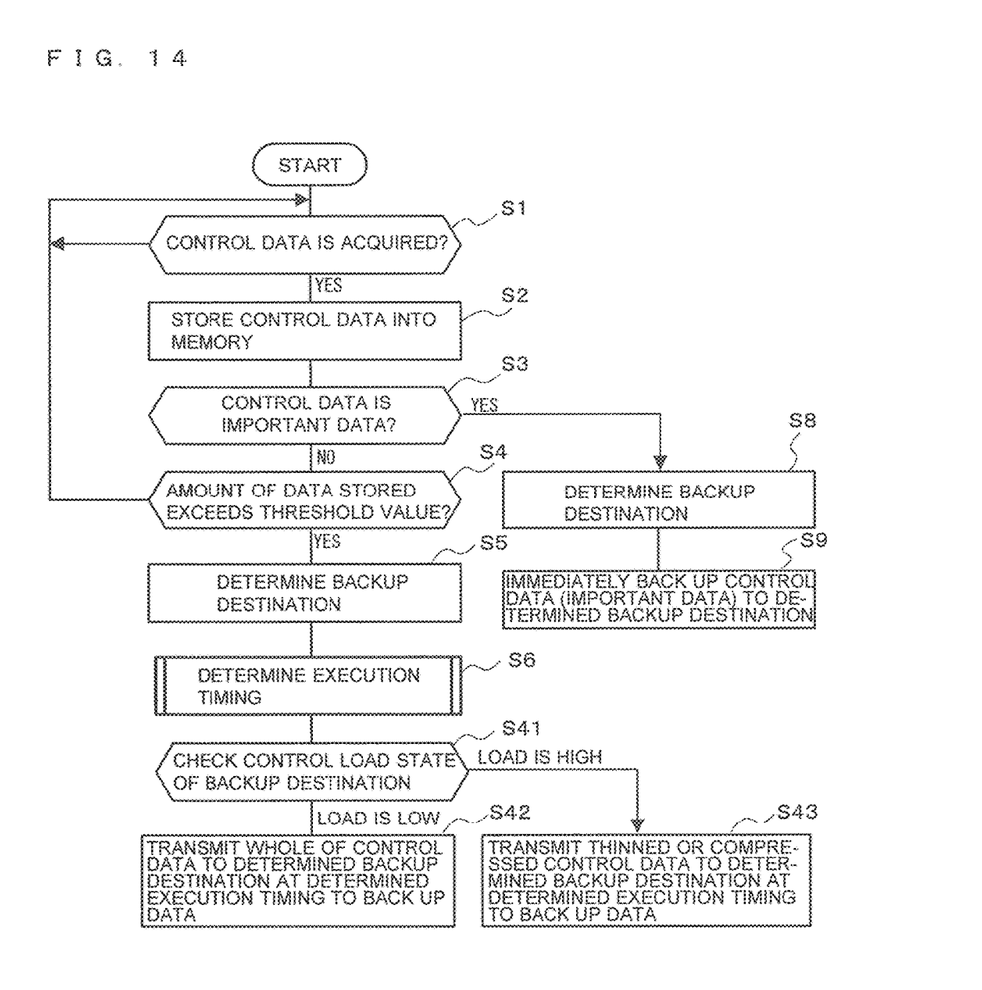
FIG. 14 is a flowchart illustrating backup of control data in any connected device in an air-conditioning apparatus control system according to Embodiment 4 of the present invention.

FIG. 14 is a flowchart illustrating control data backup in any connected device in the air-conditioning apparatus control system according to Embodiment 4 of the present invention. In FIG. 14, the same processing steps as those in Embodiment 1 illustrated in FIG. 8 are designated by the same reference step numerals. The difference between Embodiment 4 and Embodiment 1 will now be described mainly.

A backup source connected device checks a control load state of a backup destination (S41) after the execution timing determination subprocess in step S6. If the backup source connected device is the indoor unit 3, the device can check the control load state by sending a query to the controller 1 in the same apparatus 10. If the checked control load state of the backup destination is low, the backup source connected device transmits the whole of control data in the memory of the device to the backup destination determined in step S5 at execution timing determined in step S6 to back up the control data to the backup destination (S42). On the other hand, if the checked load state of the backup destination is high, the backup source connected device thins out or compresses the control data in the memory of the device and transmits the thinned or compressed control data to the backup destination to back up the control data to the backup destination (S43).

As described above, Embodiment 4 offers the same advantages as those of Embodiment 1 and further has the following advantage: when the arithmetic unit of a backup destination has a high load state, a backup source connected device thins out or compresses control data in the memory of the device and transmits the thinned or compressed control data to the backup destination to back up the control data to the backup destination. This enables a reduction in load on the arithmetic unit of the backup destination or memory usage.

Although Embodiments 1 to 4 have been described as distinct embodiments, characteristic processing steps in Embodiments 1 to 4 may be appropriately combined to achieve a connected device. For example, Embodiments 2 and 4 may be combined so that control data is thinned out or compressed and then transmitted to a backup destination in a stepwise manner to back up the data to the backup destination.

REFERENCE SIGNS LIST 1 controller 2 outdoor unit 3 indoor unit
4 general purpose device 5 remote control 10 apparatus
12 memory 13 ROM 14 communication unit
15 display unit 16 operation unit 17 arithmetic unit
21 RAM 22 memory 23 ROM
24 communication unit 25 operation unit
26 arithmetic unit 31 RAM 32 memory 33 ROM 34 communication unit 35 display unit
36 operation unit 36 arithmetic unit 41 RAM
42 memory 43 ROM 44 communication unit
45 contact 46 operation unit 47 arithmetic unit
51 RAM 52 memory 53 ROM
54 communication unit 55 display unit
56 operation unit 57 arithmetic unit
100 air-conditioning apparatus control system

The invention claimed is:

1. An air-conditioning apparatus control system comprising:
a plurality of air-conditioning apparatuses each including an outdoor unit, an indoor unit, and a controller managing and controlling the outdoor unit and the indoor unit in a centralized manner, the outdoor unit, the indoor unit, and the controller being connected so as to be able to communicate with each other, the air-conditioning apparatuses being connected so as to be able to communicate with each other, the outdoor unit, the indoor unit, and the controller each serving as an air-conditioning connected device included in the air-conditioning apparatus control system, wherein
each air-conditioning connected device includes
a memory configured to sequentially store air-conditioning control data which is acquired during operation of the plurality of air-conditioning apparatuses and is associated with control of the air-conditioning connected device, and
an arithmetic unit configured to start an air-conditioning data backup process at a backup start timing,
wherein the air-conditioning backup process executed by the arithmetic unit includes
an air-conditioning data backup destination selection subprocess of selecting a backup destination from the other air-conditioning connected devices included in the air-conditioning apparatuses based on an available memory space of the memory of each of the other air-conditioning connected devices,
an air-conditioning data execution timing determination subprocess of determining backup execution timing so that backup has no interference with communication for a normal operation in the air-conditioning apparatus control system, and
an air-conditioning data backup execution subprocess of transmitting the air-conditioning control data stored in the memory of one of the plurality of air-conditioning apparatuses to the air-conditioning data backup destination selected in the air-conditioning data backup destination selection subprocess at the air-conditioning data execution timing determined in the air-conditioning data execution timing determination subprocess to back up the air-conditioning control data to the backup destination, wherein
the arithmetic unit determines whether the air-conditioning control data is important air-conditioning data or unimportant air-conditioning data designated previously when the control data is stored into the memory of one of the plurality of air-conditioning apparatuses,
the arithmetic unit both determines, as the air-conditioning data backup start time, time when an amount of data stored in the memory of one of the air-conditioning apparatuses exceeds a threshold value previously set, and starts the air-conditioning data backup process at the determined time in response to determining that the air-conditioning control data is unimportant air-conditioning data, and
the arithmetic unit both executes the air-conditioning data backup destination selection subprocess to select an air-conditioning data backup destination and immediately backs up the air-conditioning control data to the selected backup destination in response to determining that the air-conditioning control data is important air-conditioning data.

2. The air-conditioning apparatus control system of claim 1, wherein when current communication traffic in the air-conditioning apparatus control system is less than a predetermined amount, the arithmetic unit determines the air-conditioning data execution timing so that backup is immediately executed, and when the current communication traffic is greater than or equal to the predetermined amount, the arithmetic unit determines the air-conditioning data execution timing so that backup is executed in a time period during which communication traffic is less than the predetermined amount.

3. The air-conditioning apparatus control system of claim 1, wherein if communication traffic of the air-conditioning apparatus control system is greater than or equal to a specific amount throughout one day at first backup time following exceeding of the threshold value by the amount of data stored in the memory, the arithmetic unit divides the air-conditioning control data in the memory into a plurality of data blocks and backs up the data blocks at different times in a stepwise manner.

4. The air-conditioning apparatus control system of claim 1, wherein the arithmetic unit backs up air-conditioning control data newly stored in the memory at subsequent backup time after the amount of data stored in the memory exceeds the threshold value.

5. The air-conditioning apparatus control system of claim 1,
wherein the air-conditioning control data sequentially stored into the memory is raw data acquired during operation or calculated data obtained based on the raw data, and
wherein when the raw data is acquired, the arithmetic unit stores the raw data into the memory and also stores the calculated data, obtained based on the raw data stored in the memory, into the memory, and after that, backs up the calculated data while removing the raw data used to obtain the calculated data from the memory.

6. The air-conditioning apparatus control system of claim 1, wherein when the air-conditioning data backup destination connected device has a high control load state at the air-conditioning data backup execution subprocess, the arithmetic unit thins out or compresses the air-conditioning control data in the memory and transmits the thinned or compressed data to the air-conditioning data backup destination.

7. The air-conditioning apparatus control system of claim 1, wherein at least one of a general purpose device including a programmable logic controller (PLC) and a remote control to control the indoor unit remotely is further connected as the connected device included in each air-conditioning apparatus.

8. The air-conditioning apparatus control system of claim 1, wherein the air-conditioning connected devices are the outdoor unit, the indoor unit, and the controller.

9. The air-conditioning apparatus control system of claim 1, wherein the air-conditioning control data is air-conditioning system control data corresponding to each of the plurality of air-conditioning apparatuses.

10. The air-conditioning apparatus control system of claim 9, wherein the air-conditioning control data includes billing data, operating time data, electricity rate data, refrigerant efficiency data, operating frequency data, suction temperature data, suction humidity data, device trend data, and operation description data corresponding to each of the plurality of air-conditioning apparatuses.

11. The air-conditioning control system of claim 1, wherein
   the important air-conditioning data includes billing data, operating time data, and electricity rate data corresponding to the air conditioning apparatus, and
   the unimportant air-conditioning data includes refrigerant efficiency, operating frequency, suction temperature, suction humidity, device trend data, and operation descriptions corresponding to the air conditioning apparatus.

12. The air-conditioning apparatus control system of claim 5, wherein the raw data is air-conditioning control raw data.

13. The air-conditioning apparatus control system of claim 1, wherein a determination of whether the air-conditioning control data is important data or unimportant data for each of the connected devices corresponding to the plurality of air-conditioning apparatuses is set by a user.

* * * * *